(12) United States Patent
Hansen et al.

(10) Patent No.: US 10,940,357 B2
(45) Date of Patent: Mar. 9, 2021

(54) APPARATUS, SYSTEM, AND METHOD FOR PULLEY EXERCISE EQUIPMENT IMPROVEMENT

(71) Applicant: Core Health & Fitness, LLC, Vancouver, WA (US)

(72) Inventors: Randy Hansen, Lake Forest, CA (US); David Beard, Santa Ana, CA (US); Kevin Corbalis, Tustin, CA (US)

(73) Assignee: Core Health & Fitness LLC, Vancouver, WA (US)

( * ) Notice: Subject to any disclaimer, the term of this patent is extended or adjusted under 35 U.S.C. 154(b) by 42 days.

(21) Appl. No.: 15/875,884

(22) Filed: Jan. 19, 2018

(65) Prior Publication Data
US 2018/0200563 A1 Jul. 19, 2018

Related U.S. Application Data

(60) Provisional application No. 62/448,361, filed on Jan. 19, 2017.

(51) Int. Cl.
| | | |
|---|---|---|
| *A63B 21/00* | (2006.01) | |
| *F16B 21/09* | (2006.01) | |
| *A63B 23/12* | (2006.01) | |
| *A63B 21/062* | (2006.01) | |

(52) U.S. Cl.
CPC .......... *A63B 21/156* (2013.01); *A63B 21/063* (2015.10); *A63B 21/155* (2013.01); *A63B 23/1209* (2013.01); *F16B 21/09* (2013.01); *A63B 21/0628* (2015.10); *A63B 2209/00* (2013.01)

(58) Field of Classification Search
CPC . A63B 21/156; A63B 21/063; A63B 21/1209; A63B 21/155; A63B 2209/00; F16B 2/10; F16B 7/1418; F16B 21/06–065; F16B 21/08; F16B 21/086; F16B 21/09; F16B 21/10; F16B 21/12–125; F16B 3/00–06; F16B 2021/14; Y10T 403/58–587
See application file for complete search history.

(56) References Cited

U.S. PATENT DOCUMENTS

| | | | | |
|---|---|---|---|---|
| 3,647,209 | A * | 3/1972 | La Lanne | A63B 21/063 482/103 |
| 4,492,375 | A * | 1/1985 | Connelly | A63B 21/055 482/130 |
| 5,845,898 | A * | 12/1998 | Halder | F16B 5/0628 269/48.1 |

(Continued)

*Primary Examiner* — Megan Anderson
*Assistant Examiner* — Kathleen Vermillera
(74) *Attorney, Agent, or Firm* — Kunzler Bean & Adamson

(57) ABSTRACT

An exercise machine including a vertical post and an adjustable pulley. The vertical post includes a plurality of engagement holes. The adjustable pulley is slideably connected to the vertical post. The adjustable pulley includes a pull pin and a lock. The pull pin is selectively engageable with one of the plurality of engagement holes. In response to the pull pin being engaged with an engagement hole, movement of the adjustable pulley relative to the vertical post is restricted. The lock is selectively engageable with the pull pin. In response to the lock being engaged with the pull pin, movement of the pull pin is restricted.

13 Claims, 9 Drawing Sheets

(56) References Cited

U.S. PATENT DOCUMENTS

| | | | | |
|---|---|---|---|---|
| 5,938,367 | A * | 8/1999 | Olson | A47B 57/50 |
| | | | | 403/254 |
| 6,551,226 | B1 * | 4/2003 | Webber | F16B 7/105 |
| | | | | 403/109.3 |
| 6,568,894 | B2 * | 5/2003 | Golden | F16B 21/12 |
| | | | | 411/349 |
| 8,485,950 | B2 * | 7/2013 | Adams | A63B 21/04 |
| | | | | 482/129 |
| 9,162,122 | B2 * | 10/2015 | Cameron | A63B 53/00 |
| 2007/0243042 | A1 * | 10/2007 | Baus | F16B 21/125 |
| | | | | 411/347 |
| 2019/0201739 | A1 * | 7/2019 | Johnson | A63B 22/0046 |

* cited by examiner

APPARATUS, SYSTEM, AND METHOD FOR PULLEY EXERCISE EQUIPMENT IMPROVEMENT

CROSS-REFERENCE TO RELATED APPLICATIONS

This application claims the benefit of U.S. Provisional Patent Application No. 62/448,361, entitled "Apparatus, System, and Method for Pulley Exercise Equipment Improvement," which was filed on Jan. 19, 2017, and is hereby incorporated by reference.

SUMMARY

Embodiments of an exercise machine are described. The exercise machine includes a vertical post and an adjustable pulley. The vertical post includes a plurality of engagement holes. The adjustable pulley is slideably connected to the vertical post. The adjustable pulley includes a pull pin and a lock. The pull pin is selectively engageable with one of the plurality of engagement holes. In response to the pull pin being engaged with an engagement hole, vertical movement of the adjustable pulley relative to the vertical post is restricted. The lock is selectively engageable with the pull pin to restrict movement of the pull pin. Other embodiments of the exercise machine are also described.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments provide a method for providing improvement for a pulley exercise machine.

Figure 1:
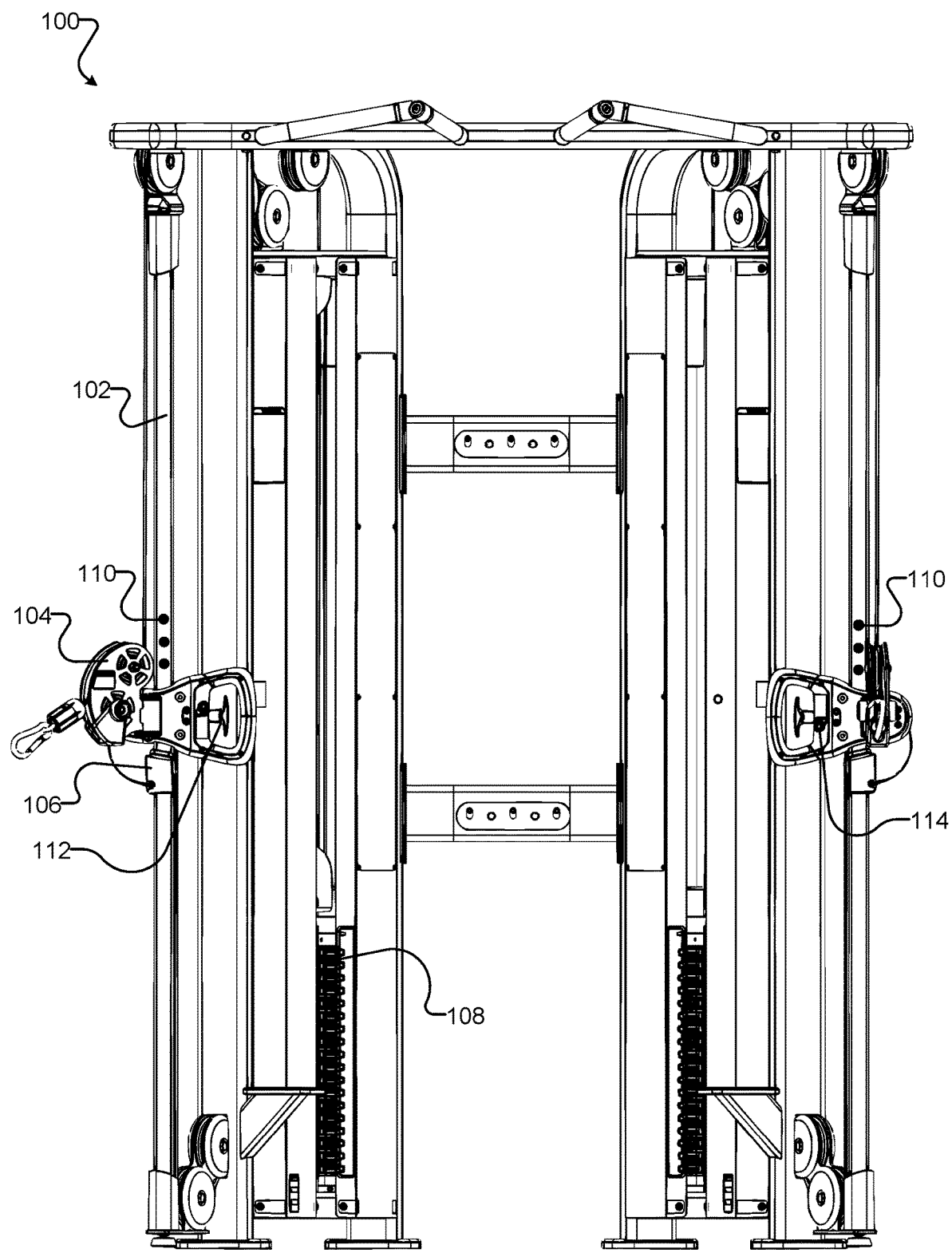
FIG. 1 depicts a front view of one embodiment of a pulley exercise machine.

FIG. 1 depicts a front view of one embodiment of a pulley exercise machine 100. The pulley exercise machine 100 includes a vertical post 102, an adjustable pulley 104, a secondary stop 106, and a weight stack 108. The pulley exercise machine 100 provides resistance to a user that operates the pulley exercise machine 100. Operation of the pulley exercise machine 100 may result in one or more weights in the weight stack 108 being lifted in response to a user pulling a cable of the pulley exercise machine 100.

The vertical post 102, in some embodiments, provides one or more surfaces on which the adjustable pulley 104 slides. In some embodiments, the vertical post 102 includes a plurality of engagement holes 110. The engagement holes 110 may be disposed along the vertical post 102 at predetermined intervals. For example, the engagement holes 110 may be disposed at three inch intervals along a portion of a length of the vertical post 102. As will be appreciated by one skilled in the art, the engagement holes 110 may be spaced at any interval.

In some embodiments, the engagement holes 110 are substantially round. In another embodiment, the engagement holes 110 have an elongated or oval-shaped profile such that they have a length along the long axis of the vertical post 102 that is less than a width of the engagement holes 110 perpendicular to the long axis of the vertical post 102. The elongated engagement holes 110 may have a tendency to allow for easier engagement of a pull pin under dynamic movement of the adjustable pulley 104.

The vertical post 102 may be connected to one or more additional components of the pulley exercise machine 100. For example the vertical post 102 may be connected to one or more frame members. The pulley exercise machine 100 may include more than one vertical post 102. For example, in the illustrated embodiment, the pulley exercise machine 100 includes two vertical posts 102.

The adjustable pulley 104 is slideably connected to the vertical post 102 in some embodiments. The adjustable pulley 104 may be configured to slide along at least a portion of the length of the vertical post 102. In some embodiments, the adjustable pulley 104 includes a pull pin handle 112 that is operable by a user to actuate a pull pin that engages an engagement hole 110. Engagement of the pull pin with an engagement hole 110 restricts sliding or vertical motion of the adjustable pulley 104 relative to the vertical post 102.

For example, the pull pin may be biased to apply a force to the pull pin that tends to move the pull pin into engagement with an engagement hole 110. A user may pull on the pull pin handle 112 to disengage the pull pin from the engagement hole 110, thus allowing sliding motion of the adjustable pulley 104 relative to the vertical post 102. The user may release the pull pin handle 112 upon the adjustable pulley 104 being at a desired location along the vertical post 102, and in response, the pull pin may be biased into engagement with an engagement hole 110.

In one embodiment, the adjustable pulley 104 includes a lock 114 to restrict movement of the pull pin. The lock 114 may be biased to engage the pull pin and restrict movement of the pull pin from an engaged position. The pull pin may be releaseable in response to actuation of the lock 114. The lock 114 may help maintain the pull pin in an engaged position when the adjustable pulley 104 undergoes repeated high stress loads, such as those applied under operation of the pulley exercise machine 100. Embodiments of the adjustable pulley 104 are described in greater detail below in relation to FIGS. 2-4.

The secondary stop 106, in one embodiment, is selectively fastenable to the vertical post 102. In certain embodiments, the secondary stop 106 restricts downward movement of the adjustable pulley 104. The secondary stop 106 may restrict an unfastened adjustable pulley 104 from making unrestricted downward motion along the vertical post 102. Embodiments of the secondary stop 106 are described in greater detail below in relation to FIGS. 5-7.

Figure 2:
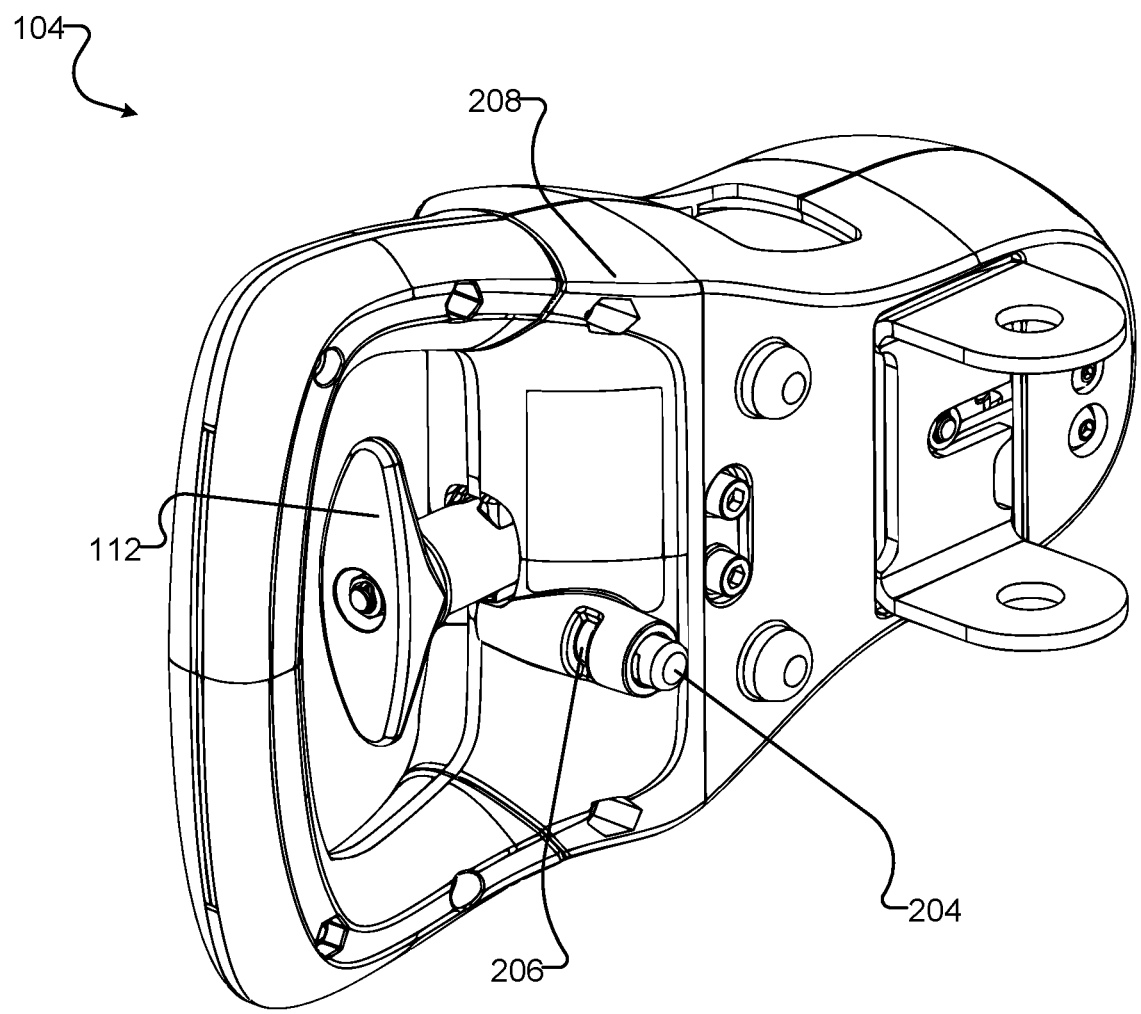
FIG. 2 depicts a perspective view of one embodiment of the adjustable pulley of FIG. 1.
Figure 3:
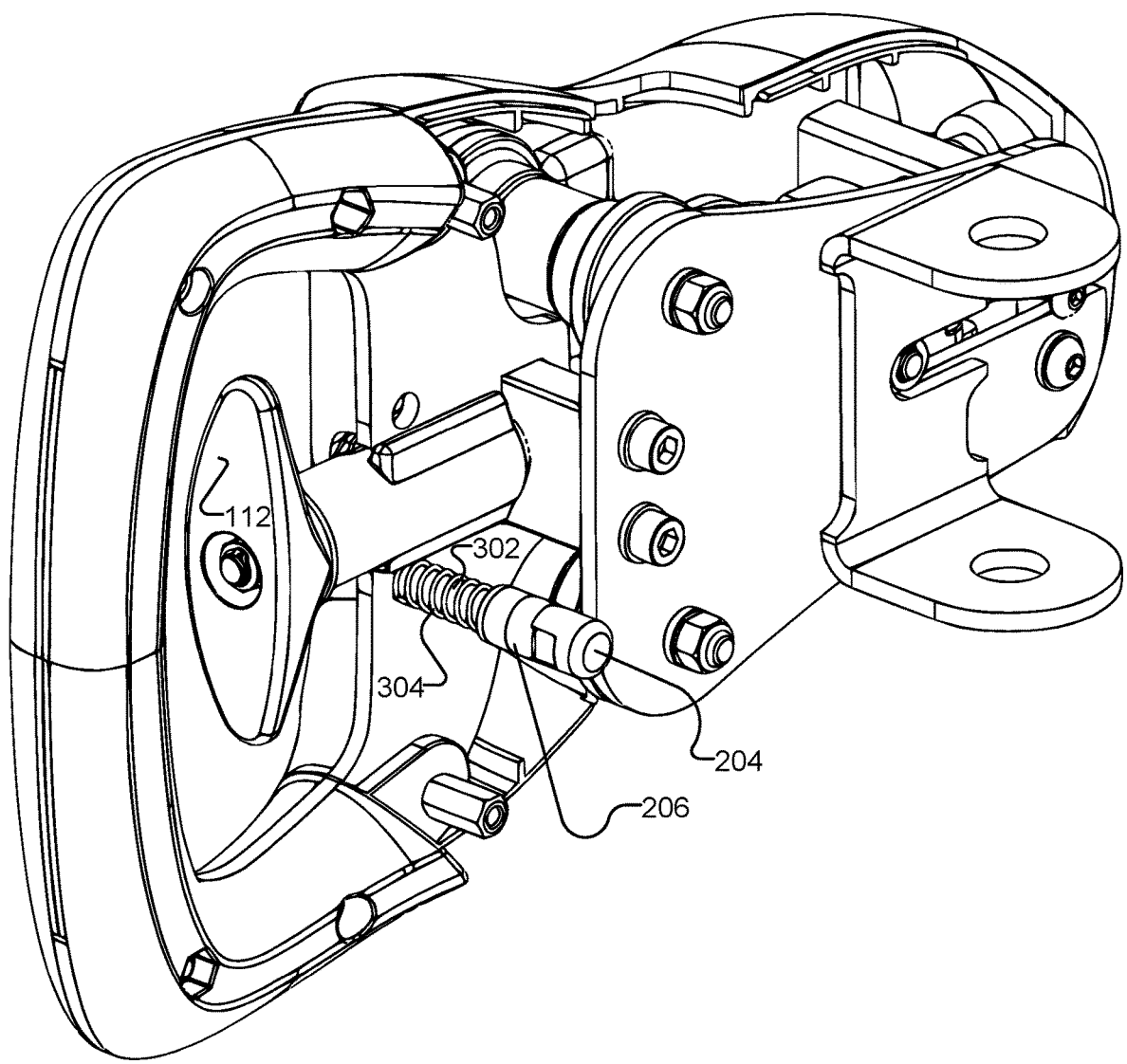
FIG. 3 depicts a perspective view of one embodiment of the adjustable pulley of FIG. 1 with the handle cowl removed.
Figure 4A:
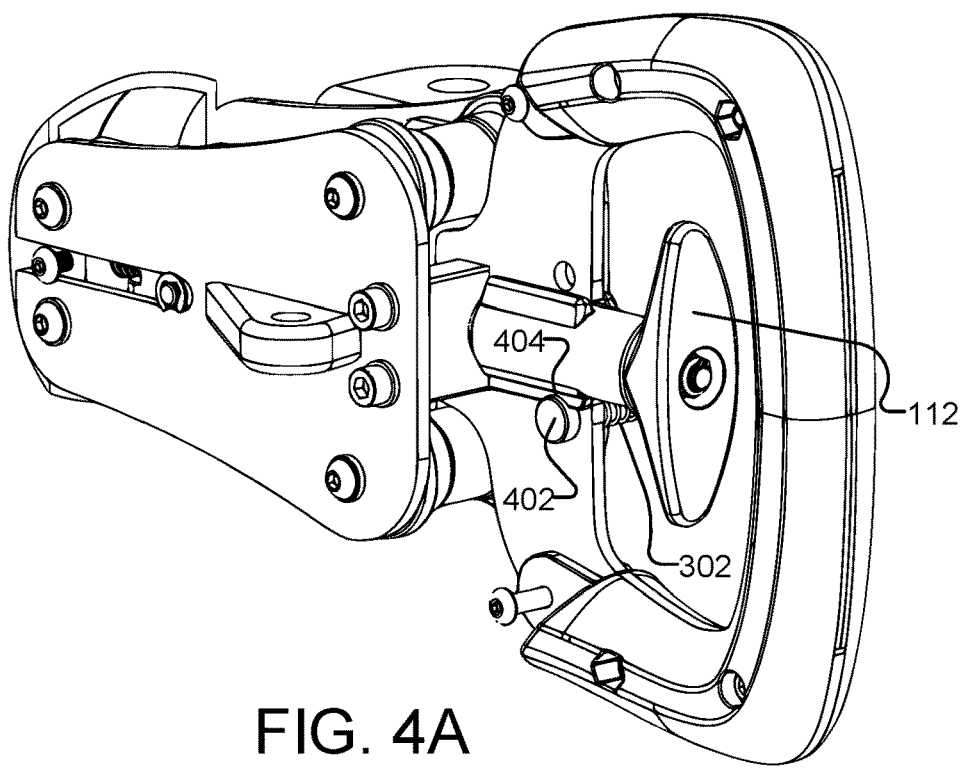
FIGS. 4A and 4B depict another perspective view and a cross-section front view of one embodiment of the adjustable pulley of FIG. 1 with the handle cowl removed.
Figure 4B:
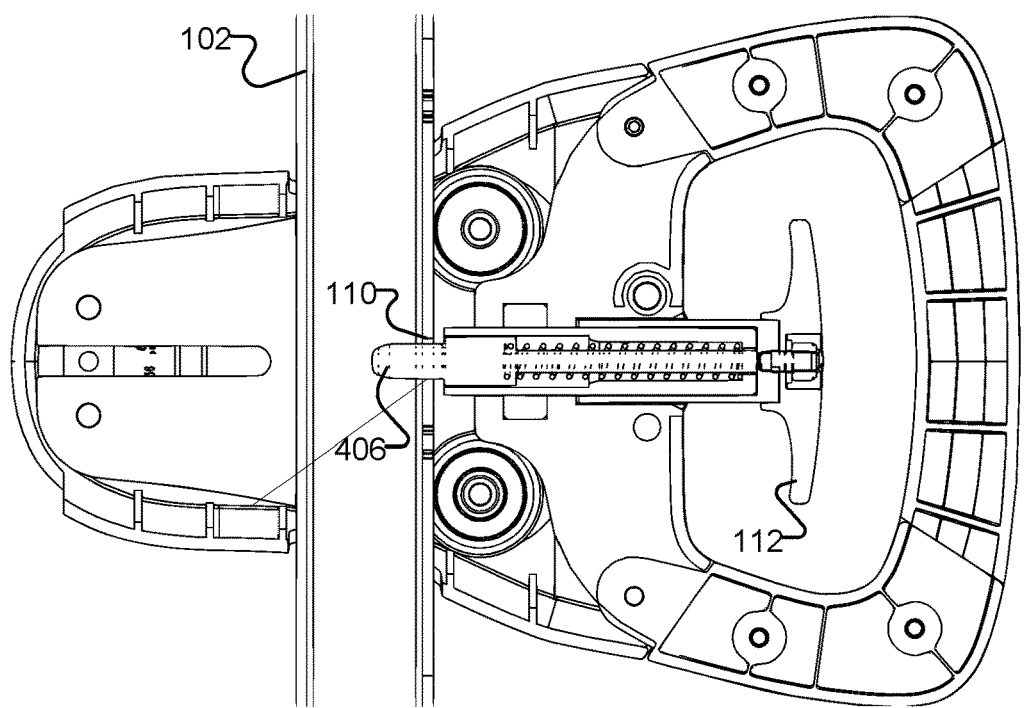

FIGS. 2-4 depict embodiments of the adjustable pulley 104 of FIG. 1. FIG. 2 is a perspective view of one embodiment of the adjustable pulley 104. FIG. 3 depicts a perspective view of one embodiment of the adjustable pulley 104 with a handle cowl 208 removed. FIGS. 4A and 4B depict another perspective view and a cross-section front view of one embodiment of the adjustable pulley of FIG. 1 with the handle cowl 208 removed. The adjustable pulley 104 includes a pull pin handle 112, a lock pin 302, a lock actuator 204, and a lock indicator 206. In FIGS. 3, 4A, and 4B the handle cowl 208 is removed to show the operation of various components of the adjustable pulley 104. The adjustable pulley 104 is selectively attachable via a pull pin 406 along the vertical post 102.

The lock pin 302, in one embodiment, interacts with the pull pin 406. In an engaged position, the lock pin 302 may restrict motion of the pull pin handle 112 from an engaged position to a disengaged position. The pull pin handle 112 may be connected to the pull pin 406 such that movement of the pull pin handle 112 results in movement of the pull pin 406. In other words, an engaged lock pin 302 may restrict the pull pin 406 from disengagement from the vertical post 102.

The lock pin 302 may be biased into the engaged position by a lock biaser 304. For example, the lock biaser 304 may be a spring configured to exert a force in a direction that tends to move the lock pin 302 into the engaged position.

The lock pin 302 may be moveable by a user from an engaged position to a disengaged position by using the lock actuator 204. For example, a user may press on the lock actuator 204 to overcome the force provided by the lock biaser 304 to move the lock pin 302 into the disengaged position. In the disengaged position, the lock pin 302 may allow motion of the pull pin handle 112 from the engaged position to the disengaged position.

In certain embodiments, the state of the lock pin 302 may be shown by the lock indicator 206. The lock indicator 206 may provide a visual indication that the lock pin 302 is in the engaged position. For example, the lock indicator 206 may show a green colored component through a window in the cowl 208 in response to the lock pin 302 being in the engaged position. The lock indicator 206 may show a red colored component through the window in the cowl 208 in response to the lock pin 302 being in the disengaged position.

The lock pin 302, in one embodiment, interacts with the pull pin handle 112 using a key 402 and a keyway 404. The key 402 and the keyway 404 may be formed with complementary surfaces that nest within one another in response to the pull pin handle 112 being in the engaged position. For example, the key 402 may include a key surface and the keyway 404 may include a keyway surface. In this example, the key surface and the keyway surface are complementary and interact with one another to restrict motion of the pull pin handle 112 when the lock pin 302 is in an engaged position. In some embodiments, the key 402 automatically engages the keyway 404 in response to the pull pin handle 112 entering the engaged position.

The key 402 and the keyway 404 may include any shapes that can be selectively engaged with one another to restrict and release movement of the pull pin handle 112. The key 402 and the keyway 404 may interfere with relative movement of each other in response to the lock pin 302 being in the engaged position. In some embodiments, transitioning the lock pin 302 to a disengaged position may cause the key 402 and keyway 404 to be in relative positions that allow the pull pin handle 112 to be actuated by a user.

Figure 5:
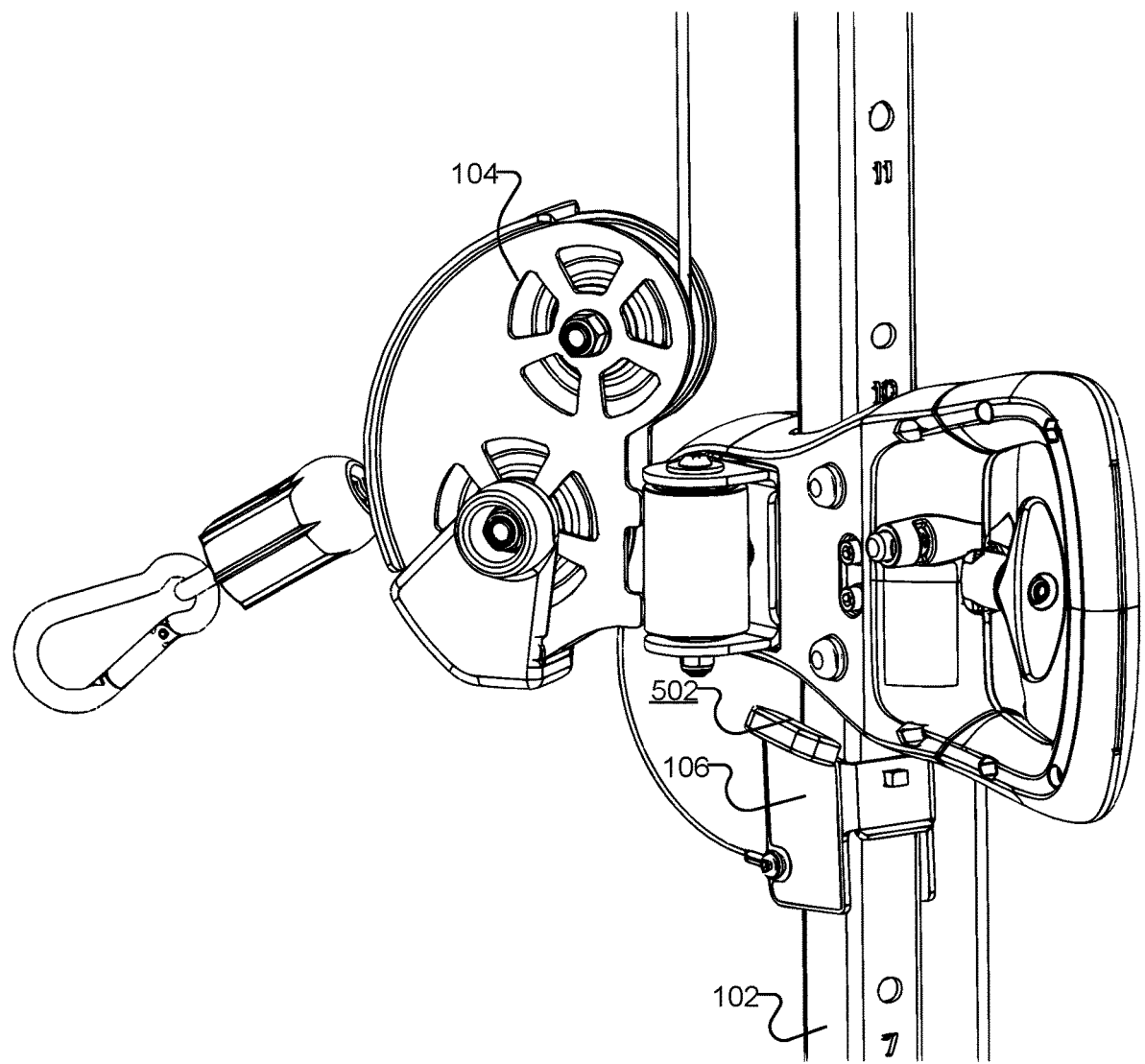
FIG. 5 depicts a perspective view of one embodiment of the adjustable pulley and secondary stop of FIG. 1.
Figure 6:
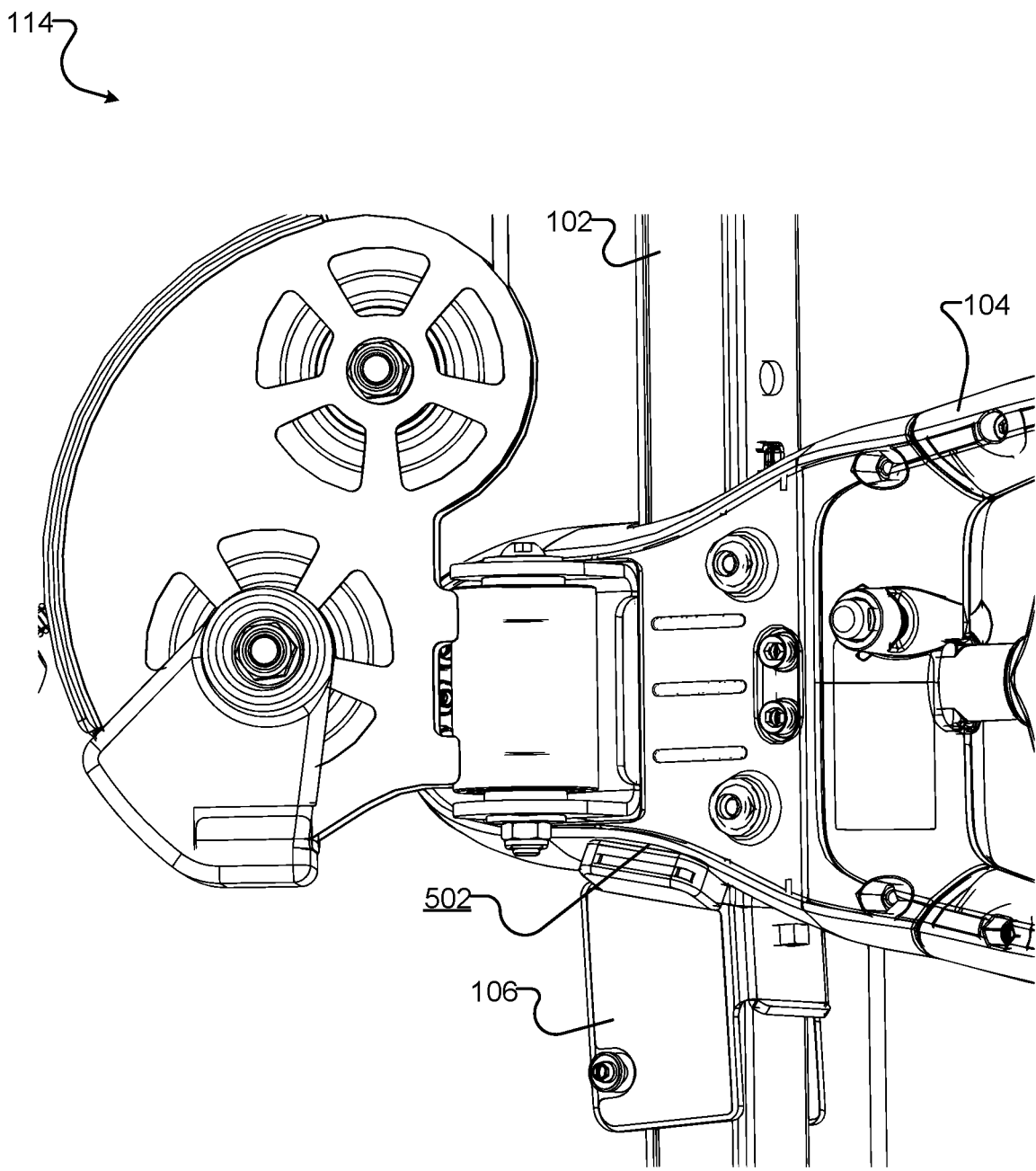
FIG. 6 depicts a perspective view of one embodiment of the adjustable pulley and secondary stop of FIG. 1 with the adjustable pulley engaged by the secondary stop.

FIGS. 5 and 6 depict perspective views of one embodiment of the adjustable pulley 104 and secondary stop 106 of FIG. 1. FIG. 5 depicts the adjustable pulley 104 in a position where the pull pin 406 restricts movement of the adjustable pulley 104 relative to the vertical post 102. FIG. 6 depicts the adjustable pulley 104 with the pull pin 406 in the disengaged position and downward movement of the adjustable pulley 104 restricted by the secondary stop 106.

The secondary stop 106, in some embodiments, includes an impact surface 502. The impact surface 502 is configured to receive a surface of the adjustable pulley 104 and restrict downward motion of the adjustable pulley 104. The impact surface 502 may include any material strong enough to resist movement of the adjustable pulley 104. The impact surface 502 may include a compliant material to reduce shock loads on the adjustable pulley 104 generated by impact between the impact surface 502 and the adjustable pulley 104. For example, the impact surface 502 may include a steel flange with a synthetic rubber cover.

In certain embodiments, the secondary stop 106 is positioned a predetermined distance below the adjustable pulley 104 when the adjustable pulley 104 is fastened to the vertical post 102. The predetermined distance between the secondary stop 106 and the adjustable pulley 104 may be influenced by the position of the engagement holes 110. For example, the engagement holes 110 may be four inches apart, and the secondary stop 106 may engage the engagement hole 110 below the engagement hole 110 engaged by the adjustable pulley 104. In this example, the geometry of the secondary stop 106 and the geometry of the adjustable pulley 104 will influence a distance between the adjustable pulley 104 and the secondary stop 106.

In some embodiments, the distance between the secondary stop 106 and the adjustable pulley 104, when both are engaged with the vertical post 102, is relatively small. A relatively small distance between the secondary stop 106 and the adjustable pulley 104 may reduce shock loads on various components of the pulley exercise machine 100 in the event that the pull pin 406 becomes disengaged from the vertical post 102 under use. For example, the secondary stop 106 may be configured to be between one half and four inches below the adjustable pulley 104 when both are engaged with the vertical post 102. In this example, if the attachment between the adjustable pulley 104 and the vertical post 102 is not properly engaged by a user, the adjustable pulley 104 will be limited to falling between one half and four inches before being stopped by the secondary stop 106.

The secondary stop 106 may be any predetermined distance below the adjustable pulley 104 when both are engaged with the vertical post 102. For example, the geometry of the various components may dictate a predetermined distance of one inch. In another example, the geometry of the various components may dictate a predetermined distance of two inches. In yet another embodiment, the geometry of the various components may dictate a predetermined distance of between one inch and two inches.

Figure 7A:
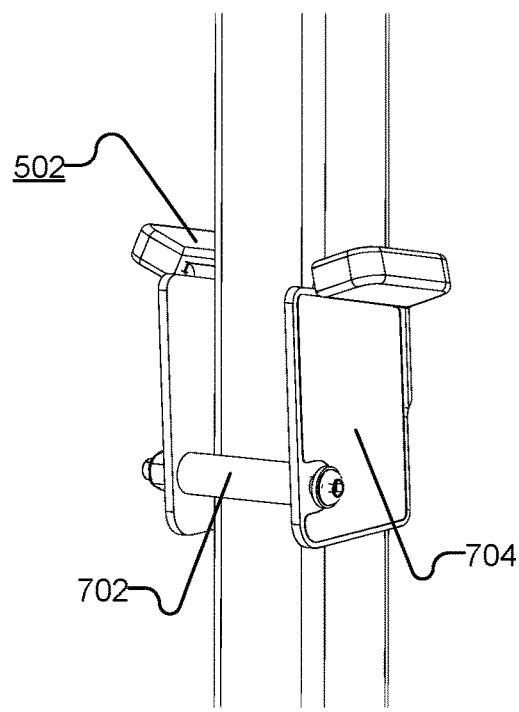
FIGS. 7A-7D depict perspective views of one embodiment of the secondary stop in engaged and disengaged states.
Figure 7B:
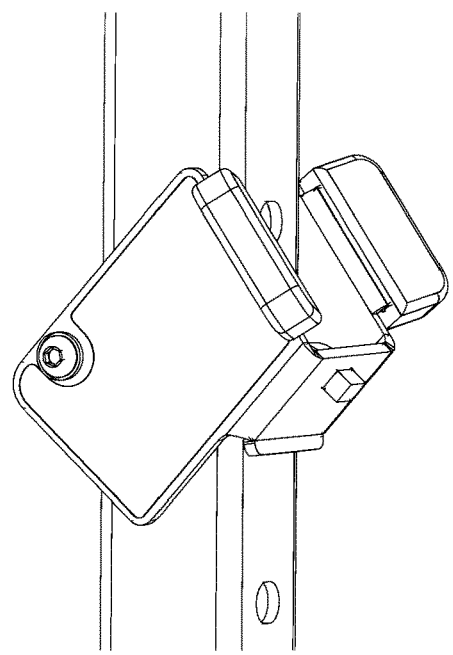
Figure 7C:
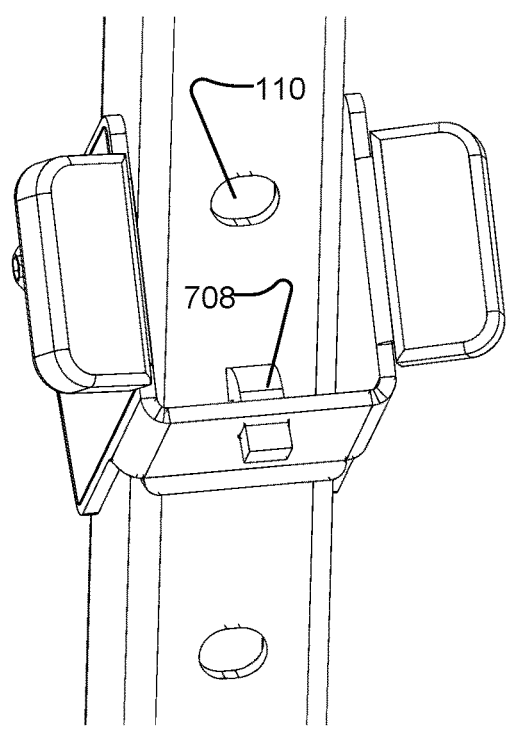
Figure 7D:
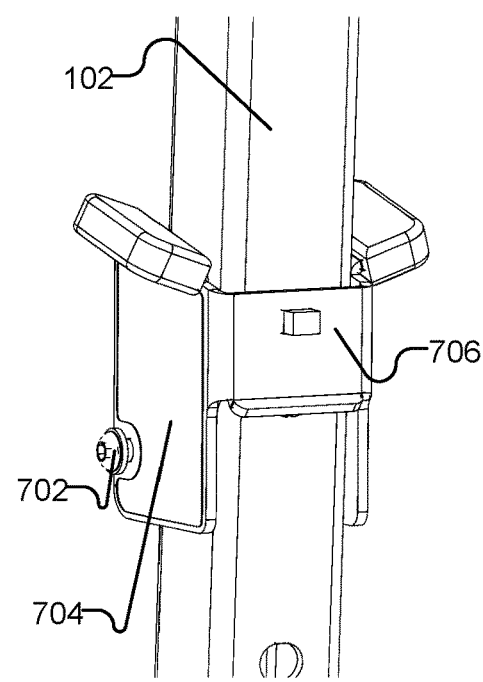

FIGS. 7A-7D depict perspective views of one embodiment of the secondary stop 106 in engaged and disengaged states. FIGS. 7A and 7D show the secondary stop 106 in an engaged state. FIGS. 7B and 7C show the secondary stop 106 in a disengaged state. The secondary stop 106 includes a pivot 702, a side flange 704, a front flange 706, and an impact surface 502. The secondary stop 106 restricts downward movement of the adjustable pulley 104.

The pivot 702, in some embodiments, is a member around which the secondary stop 106 pivots during transitions between the engaged state and the disengaged state. The pivot 702 may contact the vertical post 102 during such transitions. In one embodiment, the pivot 702 includes a cylindrical member. In some embodiments, the pivot 702 includes a bolt.

The side flange 704, in one embodiment, includes a surface to interact with the vertical post 102. For example, the side flange 704 may include a flat surface configured to slide along a length of the vertical post 102. The side flange 704 may be connected to the pivot 702 and the front flange 706. In some embodiments, the secondary stop 106 includes a second side flange.

In some embodiments, the front flange 706 includes an engagement member 708. The engagement member 708 is configured to engage an engagement hole 110 and restrict movement of the secondary stop 106 under a downward force. For example, the engagement member 708 may be a downward curving hook, such that moving the secondary stop 106 to the disengaged state requires at least some upward motion of the engagement member 708.

In certain embodiments, the side flange 704 has a longer length along the vertical axis than the front flange 706. The front flange 706 may be connected to the side flange 704 such that the front flange 706 does not extend to the bottom of the side flange 704. The pivot 702 may be connected to the side flange 704 at a position lower on the side flange 704 than the front flange 706 extends. This arrangement may facilitate a pivoting motion of the secondary stop 106 as it surrounds the vertical post 102.

The secondary stop 106 may include any material capable of withstanding the loads applied to the secondary stop 106. For example, the secondary stop 106 may include steel, aluminum, titanium, alloys thereof, or other metallic materials.

Figure 8:
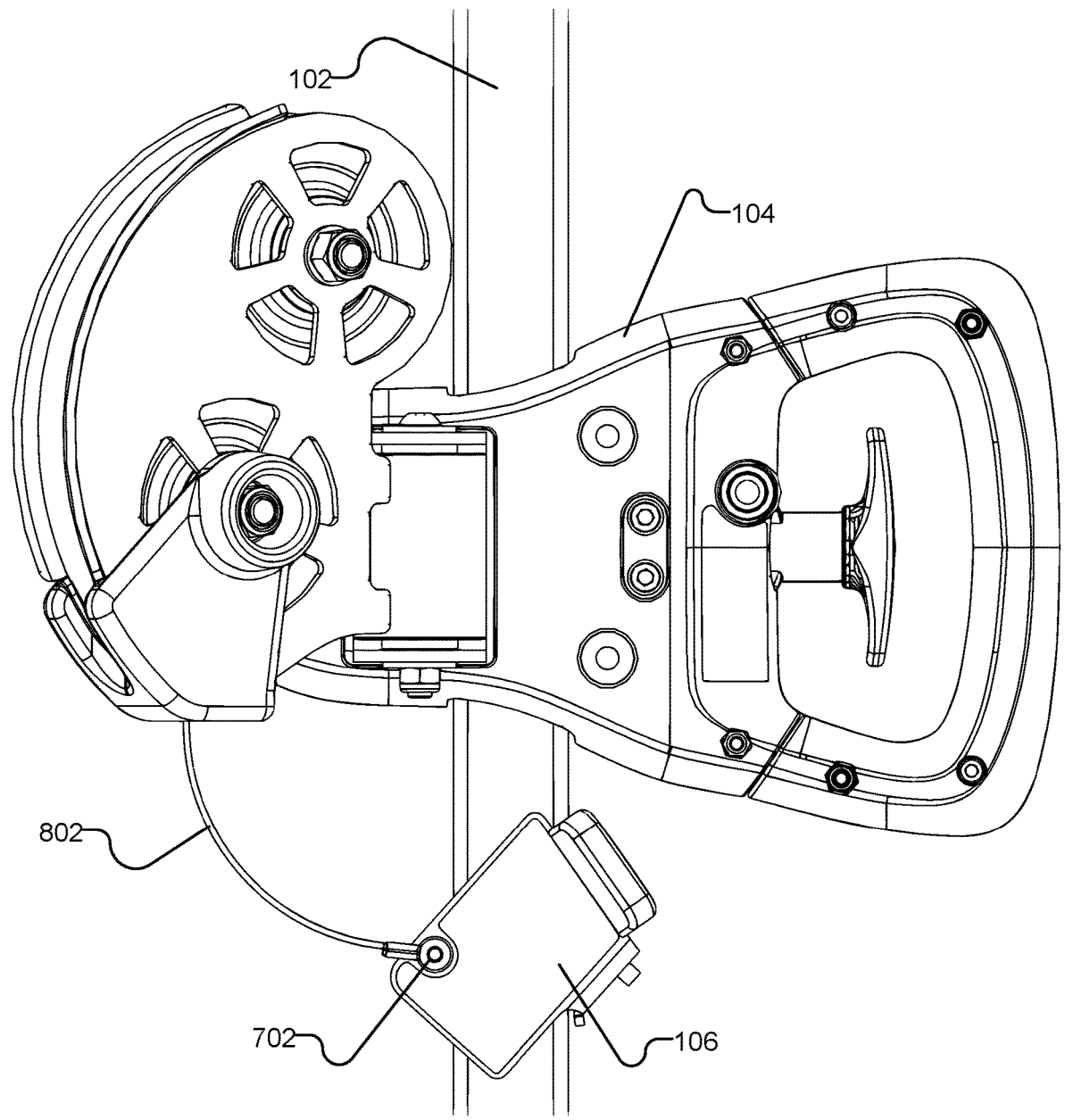
FIG. 8 depicts a side view of one embodiment of the adjustable pulley and the secondary stop of FIG. 1 with the secondary stop tethered to the adjustable pulley.

FIG. 8 depicts a side view of one embodiment of the adjustable pulley 104 and the secondary stop 106 of FIG. 1 with the secondary stop 106 tethered to the adjustable pulley 104 by a tether 802. The tether 802 maintains the secondary stop 106 in relatively close proximity to the adjustable pulley 104 when the secondary stop 106 is in a disengaged state.

The tether 802 may be a flexible component capable of supporting the secondary stop 106. For example, the tether 802 may be a metallic cable.

In some embodiments, the tether 802 is connected to the secondary stop 106 below a center of mass of the secondary stop 106. The tether 802 may be connected to the secondary stop 106 at or near the pivot 702. In this configuration, the secondary stop 106 will tend to rotate around the pivot 702 into a disengaged state in response to being supported by the tether 802. This may result in relatively easy repositioning of the adjustable pulley 104 by a user.

In another embodiment, the tether 802 is connected to the secondary stop 106 above a center of mass for the secondary stop 106. In some embodiments, the tether 802 is connected to the secondary stop 106 at or near the engagement member 708. In this configuration, the secondary stop 106 will tend to orient into an engaged state while supported by the tether 802. This may result in the secondary stop 106 tending to engage the vertical post 102 as the adjustable pulley 104 moves downward.

Figure 9:
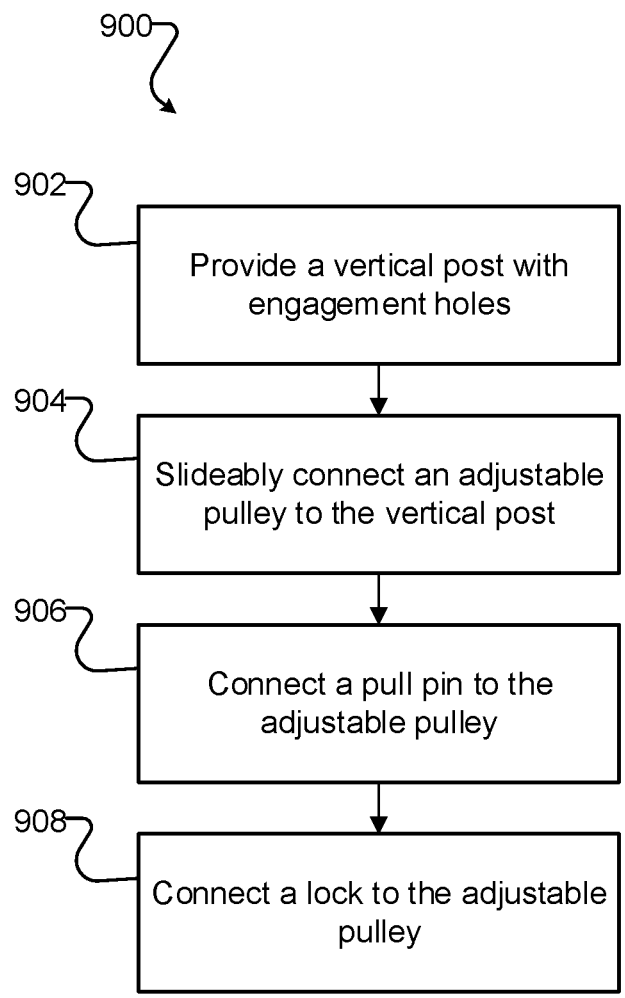
FIG. 9 is a flowchart diagram depicting one embodiment of a method for manufacturing a pulley exercise machine with a locking pull pin.

FIG. 9 is a flowchart diagram depicting one embodiment of a method 900 for manufacturing a pulley exercise machine 100. The method 900 is in certain embodiments a method of use of the system and apparatus of FIGS. 1-9, and will be discussed with reference to those figures. Nevertheless, the method 900 may also be conducted independently thereof and is not intended to be limited specifically to the specific embodiments discussed above with respect to those figures.

As shown in FIG. 9, a vertical post 102 is provided 902. The vertical post 102 may include a plurality of engagement holes 110.

In certain embodiments, an adjustable pulley 104 is slideably connected 904 to the vertical post 102. The adjustable pulley 104 may be movable in an vertical direction in response to a user input.

A pull pin 406 to selectively engage an engagement hole 110 is connected 906 to the adjustable pulley 104 in some embodiments. The pull pin 406 may be connected to a pull pin handle 112. The pull pin handle 112 may provide a user-friendly surface for actuating the pull pin 406.

In some embodiments, a lock 114 to restrict movement of the pull pin 406 is connected to the adjustable pulley 104. The lock 114 may restrict motion of the pull pin 406, the pull pin handle 112, or both the pull pin 406 and the pull pin handle 112.

The components described herein may include any materials capable of performing the functions described. Said materials may include, but are not limited to, steel, stainless steel, titanium, tool steel, aluminum, polymers, and composite materials. The materials may also include alloys of any of the above materials. The materials may undergo any known treatment process to enhance one or more characteristics, including but not limited to heat treatment, hardening, forging, annealing, and anodizing. Materials may be formed or adapted to act as any described components using any known process, including but not limited to casting, extruding, injection molding, machining, milling, forming, stamping, pressing, drawing, spinning, deposition, winding, molding, and compression molding.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by any claims appended hereto and their equivalents.

What is claimed is:
1. An exercise machine comprising:
a vertical post comprising a plurality of engagement holes;
an adjustable pulley slideably connected to the vertical post, the adjustable pulley comprising:

a pull pin movable between an engaged state where the pull pin engages one of the plurality of engagement holes and restricts vertical movement of the adjustable pulley relative to the vertical post, and a disengaged state that permits vertical movement of the adjustable pulley relative to the vertical post, and wherein the pull pin is movable towards and away from the one of the plurality of engagement holes; and a lock comprising a key and a keyway, the lock movable between an engaged position that restricts movement of the pull pin and a disengaged position that permits movement of the pull pin, and wherein the lock comprises a lock pin that is disposed transverse to the pull pin, wherein the lock pin is configured to actuate the key, and wherein the lock further comprises a lock biaser that applies a force to the lock pin in a direction of the engaged position of the lock pin.

2. The exercise machine of claim 1, further comprising a secondary stop selectively fastenable to the vertical post wherein the secondary stop interferes with downward movement of the adjustable pulley.

3. The exercise machine of claim 2, further comprising an impact surface that interferes with downward translation of the adjustable pulley.

4. The exercise machine of claim 2, wherein the secondary stop further comprises a downward curving hook.

5. The exercise machine of claim 4, wherein the secondary stop is pivotable around a pivot, wherein pivoting the secondary stop to a first orientation engages the downward curving hook with an engagement hole of the plurality of engagement holes.

6. The exercise machine of claim 5, wherein the secondary stop is connected to the adjustable pulley by a flexible tether.

7. The exercise machine of claim 6, wherein an upward force on the flexible tether promotes rotation of the secondary stop around the pivot that moves the secondary stop to a second orientation that disengages an engagement member of the secondary stop from the engagement hole.

8. The exercise machine of claim 1, wherein the key includes a key surface and the keyway includes a keyway surface and the key surface and the keyway surface interfere with one another in response to the lock being in the engaged position.

9. The exercise machine of claim 1, wherein the lock biaser is a coil spring.

10. The exercise machine of claim 1, further comprising a window formed in a handle cowl through which a visual indication of the engaged state or the disengaged state of the lock is displayed.

11. The exercise machine of claim 1, wherein each engagement hole of the plurality of engagement holes has a length along a long axis of the vertical post and a width perpendicular to the long axis of the vertical post, and wherein the length is less than the width.

12. An exercise machine comprising:
a vertical post comprising a plurality of engagement holes;
an adjustable pulley slideably connected to the vertical post, the adjustable pulley comprising:
a pull pin movable between an engaged state where the pull pin engages one of the plurality of engagement holes and restricts vertical movement of the adjustable pulley relative to the vertical post, and a disengaged state that permits vertical movement of the adjustable pulley relative to the vertical post, and wherein the pull pin is movable towards and away from the one of the plurality of engagement holes; and
a lock movable between an engaged position that restricts movement of the pull pin and a disengaged position that permits movement of the pull pin, the lock comprising:
a key comprising a key surface;
a keyway comprising a keyway surface;
a lock pin that is disposed transverse to the pull pin and configured to actuate the key;
a lock biaser configured to apply a force to the key promoting engagement of the key surface with the keyway surface; and
wherein movement of the pull pin is restricted in response to engagement of the key surface with the keyway surface.

13. A method of manufacture of an exercise machine, the method comprising:
providing a vertical post comprising a plurality of engagement holes;
slideably connecting an adjustable pulley to the vertical post;
connecting a pull pin to the adjustable pulley, wherein the pull pin is movable between an engaged state where the pull pin engages one of the plurality of engagement holes and restricts vertical movement of the adjustable pulley relative to the vertical post, and a disengaged state that permits vertical movement of the adjustable pulley relative to the vertical post, and wherein the pull pin is movable towards and away from the one of the plurality of engagement holes; and
connecting a lock comprising a key and a keyway to the adjustable pulley, wherein the lock is movable between an engaged position that restricts movement of the pull pin and a disengaged position that permits movement of the pull pin, and wherein the lock comprises a lock pin that is disposed transverse to the pull pin, wherein the lock pin is configured to actuate the key, and wherein the lock further comprises a lock biaser that applies a force to the lock pin in a direction of the engaged position of the lock pin.

* * * * *